United States Patent
Covic et al.

(10) Patent No.: US 9,620,281 B2
(45) Date of Patent: Apr. 11, 2017

(54) INDUCTIVE POWER RECEIVER APPARATUS

(75) Inventors: Grant Anthony Covic, Auckland (NZ); Mickel Bipin Budhia, Auckland (NZ)

(73) Assignee: AUCKLAND UNISERVICES LIMITED, Auckland (NZ)

(*) Notice: Subject to any disclaimer, the term of this patent is extended or adjusted under 35 U.S.C. 154(b) by 908 days.

(21) Appl. No.: 13/814,542

(22) PCT Filed: Aug. 5, 2011

(86) PCT No.: PCT/NZ2011/000154
§ 371 (c)(1),
(2), (4) Date: Jun. 20, 2013

(87) PCT Pub. No.: WO2012/018269
PCT Pub. Date: Feb. 9, 2012

(65) Prior Publication Data
US 2013/0285463 A1    Oct. 31, 2013

(30) Foreign Application Priority Data

Aug. 6, 2010 (WO) ............... PCT/NZ2010/000160
Nov. 1, 2010 (NZ) ....................................... 588937

(51) Int. Cl.
| | |
|---|---|
| *H01F 27/42* | (2006.01) |
| *H01F 38/14* | (2006.01) |
| *H01F 27/34* | (2006.01) |
| *H02J 5/00* | (2016.01) |
| *H01F 27/28* | (2006.01) |
| *H01F 41/04* | (2006.01) |

(52) U.S. Cl.
CPC ........ *H01F 38/14* (2013.01); *H01F 27/2885* (2013.01); *H01F 27/346* (2013.01); *H01F 41/04* (2013.01); *H02J 5/005* (2013.01); *Y10T 29/4902* (2015.01)

(58) Field of Classification Search
CPC ........ H01F 27/346; H01F 38/14; H01F 41/04; Y10T 29/4902; H02J 5/005
USPC ....................................................... 307/104
See application file for complete search history.

(56) References Cited

U.S. PATENT DOCUMENTS 4,973,907 A * 11/1990 Bergman ........... G01R 33/3415
324/318
9,071,061 B2 * 6/2015 Boys ....................... H02J 5/005
(Continued)

FOREIGN PATENT DOCUMENTS

| WO | WO2007090168 | 8/2007 |
| WO | WO2008140333 | 11/2008 |
| WO | WO2010090539 | 8/2010 |

OTHER PUBLICATIONS

U.S. Appl. No. 12/451,436, filed Jan. 13, 2010.
(Continued)

*Primary Examiner* — Jared Fureman
*Assistant Examiner* — Duc M Pham
(74) *Attorney, Agent, or Firm* — Law Office of Richard F. Jaworski

(57) ABSTRACT

A magnetic flux pad (BPP) is provided for receiving magnetic flux. The pad may be used with an inductive power transfer system, and comprises a magnetically permeable core (4) and two substantially flat overlapping coils (2, 3) magnetically associated with the core (4).

20 Claims, 6 Drawing Sheets

The bipolar pad seen from the side (top) and from above (bottom).

(56) References Cited

U.S. PATENT DOCUMENTS

| | | | |
|---|---|---|---|
| 2004/0032262 A1* | 2/2004 | Withers | G01R 33/341 |
| | | | 324/318 |
| 2009/0302688 A1 | 12/2009 | Boys | |
| 2009/0303749 A1* | 12/2009 | Boys | H02J 5/005 |
| | | | 363/13 |
| 2012/0119698 A1* | 5/2012 | Karalis | B60L 11/182 |
| | | | 320/108 |
| 2012/0217111 A1* | 8/2012 | Boys | H01F 38/14 |
| | | | 191/10 |

OTHER PUBLICATIONS

Doran Kwiat et al., Calculation of the Mutual Induction Between Coplanar Circular Surface Coils in Magnetic Resonance Imaging, IEEE Transactions on Biomedical Engineering, vol. 39, No. 5, pp. 433-436, May 1992.

* cited by examiner

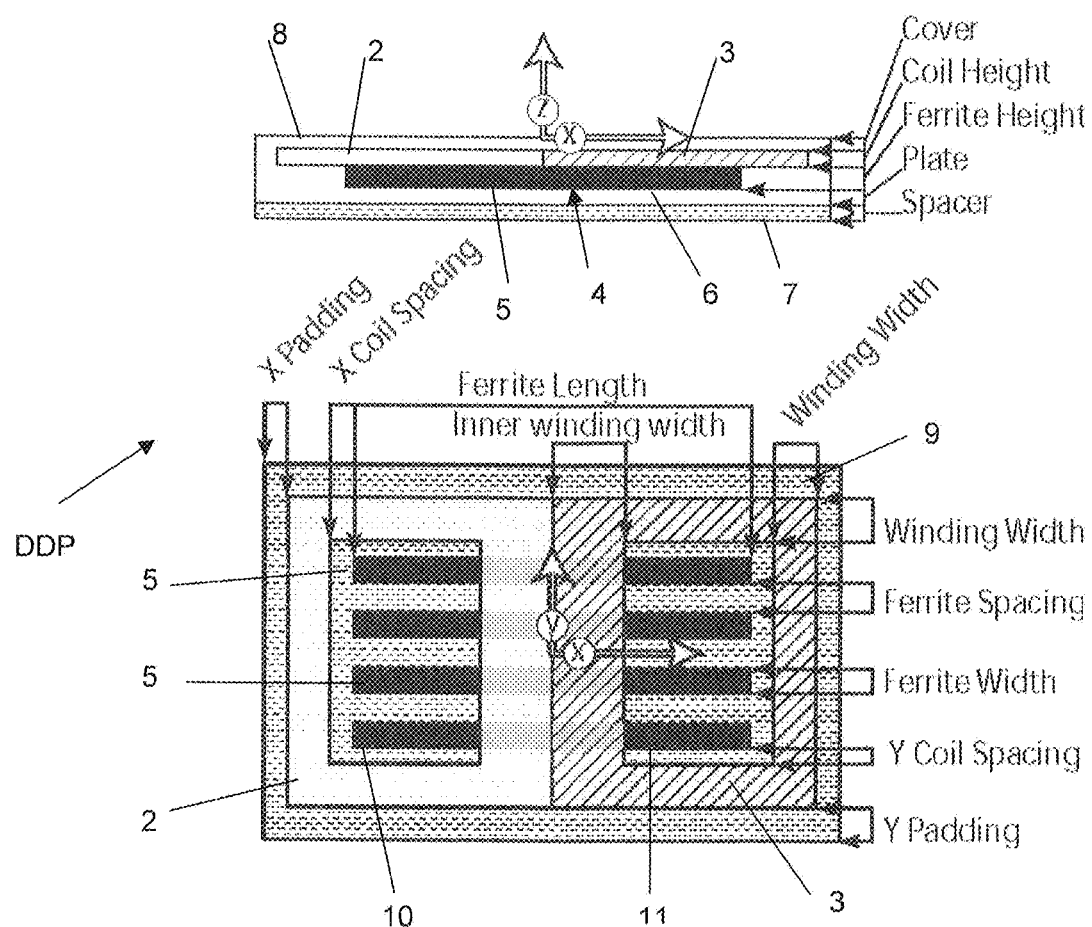
Figure 1: The DDP pad seen from the side (top) and from above (bottom).

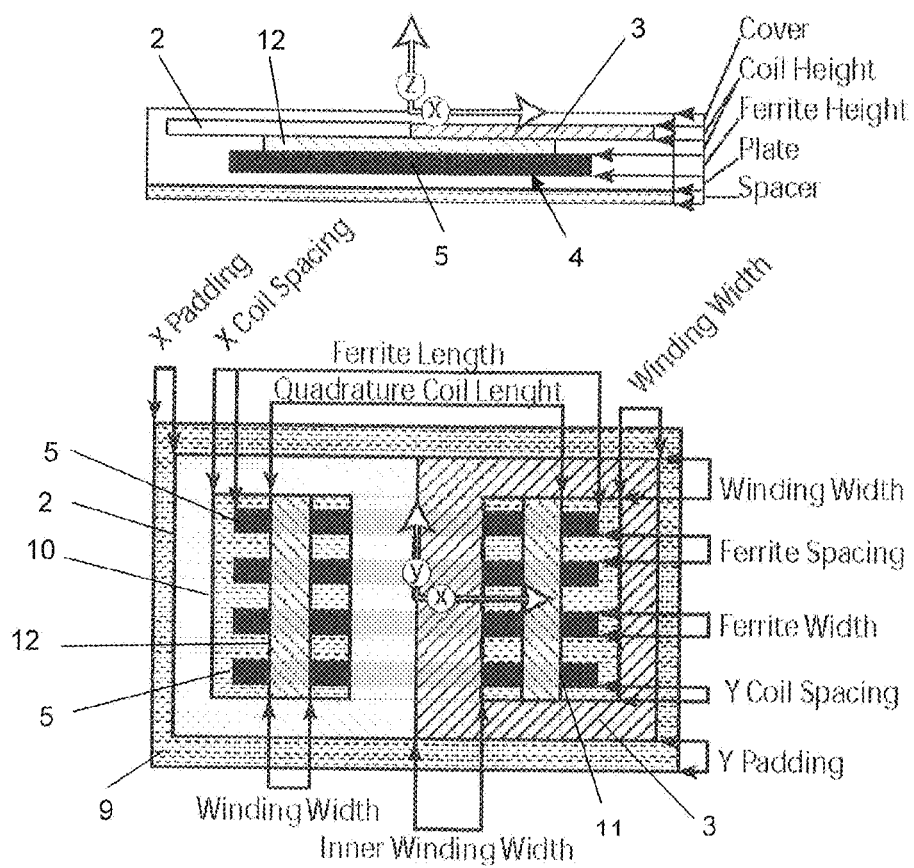
Figure 2: The double D quadrature pad seen from the side (top) and from above (bottom).

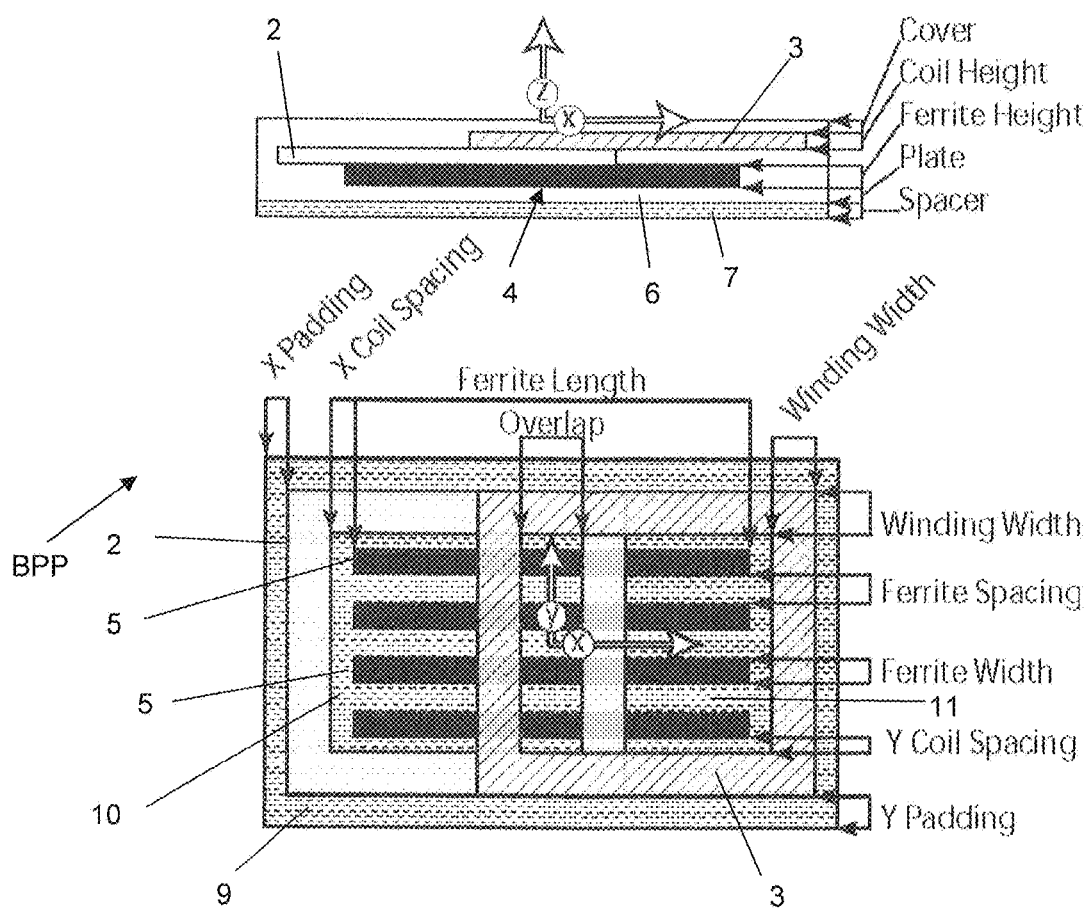
Figure 3: The bipolar pad seen from the side (top) and from above (bottom).

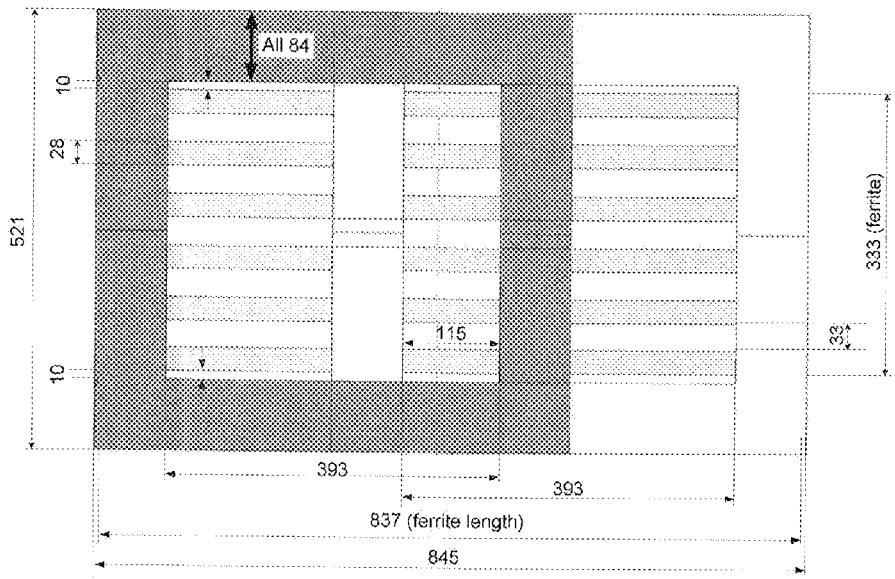
Figure 4: The Bipolar Receiver Pad shown with csX= □□80mm and Overlap = 115mm
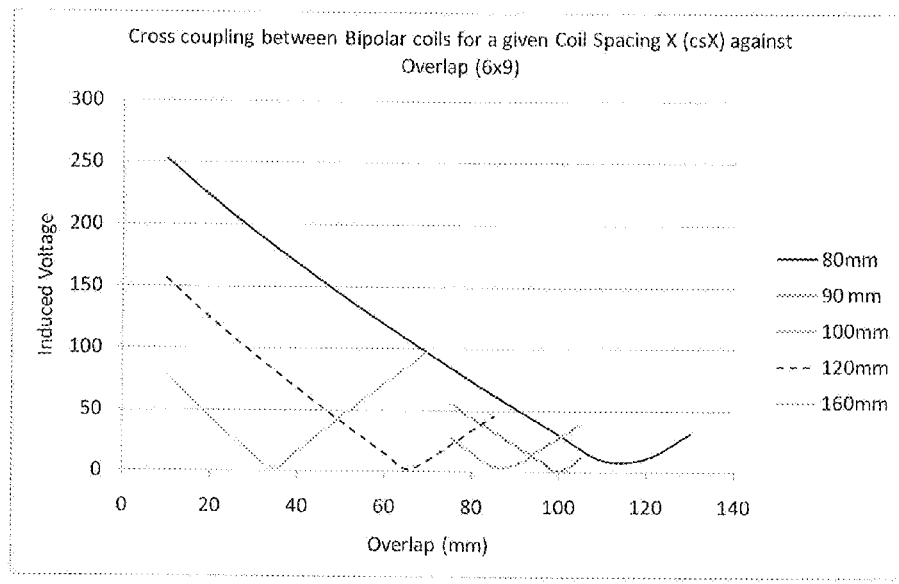
Figure 5: The induced voltage in a second receiver coil with varying X coil spacing (csX) versus changing "Overlap" of the two coils, when a first receiver coil is energised. Note while absolute csX values are given, all are effectively negative to co-inside with Figure 3.

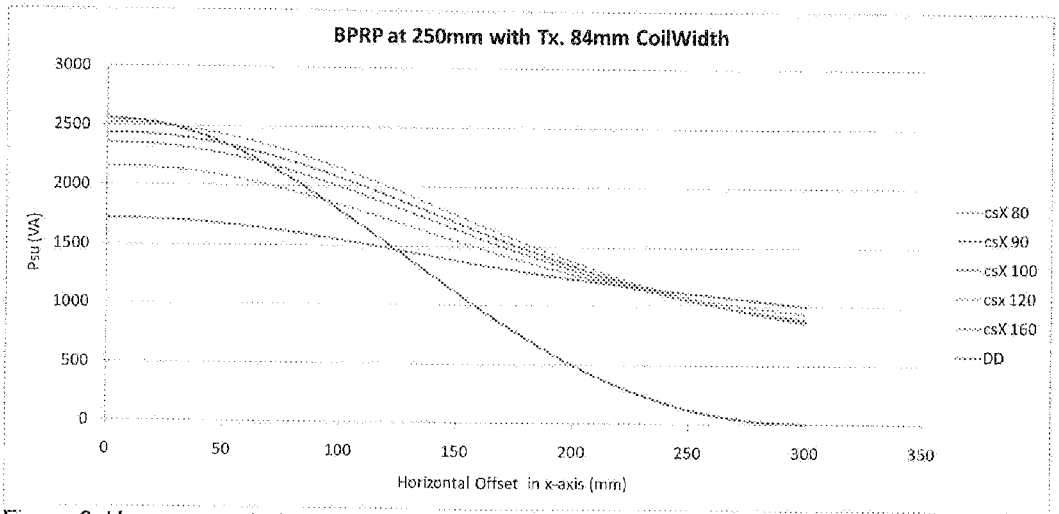

Figure 6: Uncompensated power profile of various BPRP designs versus a standard DDP at 250mm vertical offset

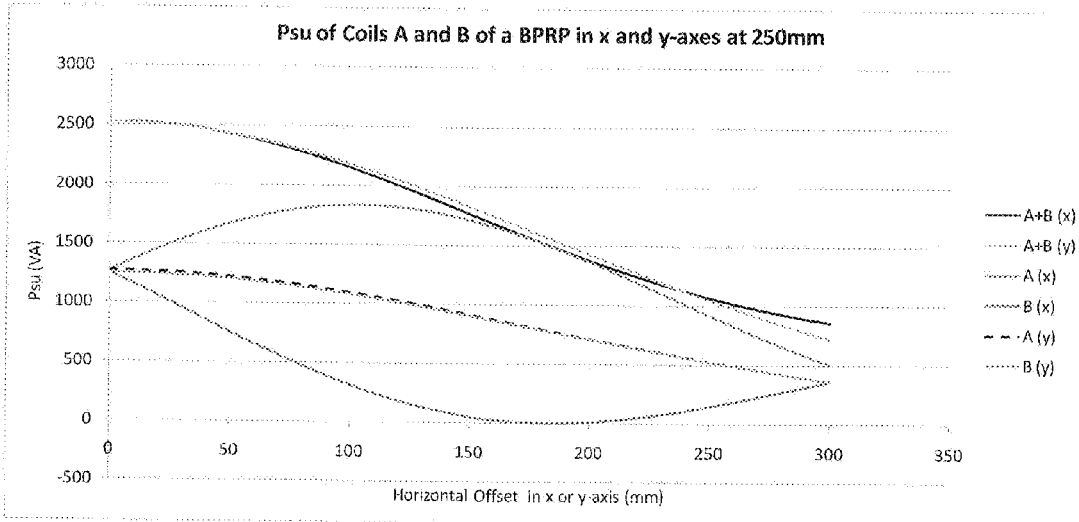

Figure 7: The uncompensated power profile of a BPRP receiver with csX= ⊓80mm and overlap = 115mm when placed above a DDP transmitter at fixed height of 250mm. Here each bipolar coil's contribution is explicitly shown as the BPRP is shifted laterally in either the positive x or positive y directions.

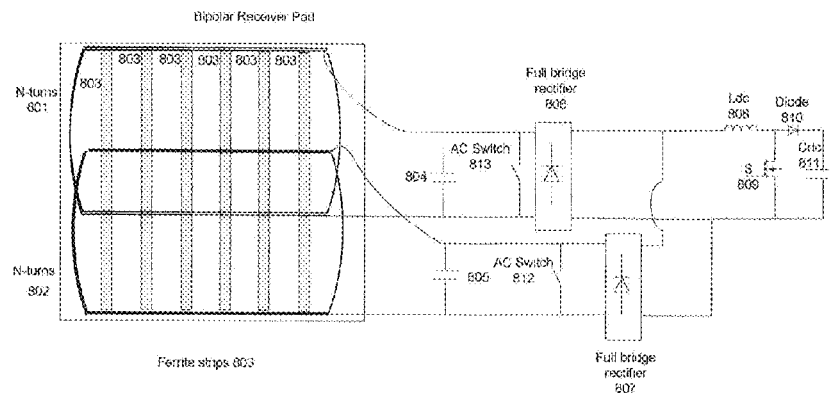
Figure 8: Example decoupling regulator for the Bipolar Receiver pad (BPRP)
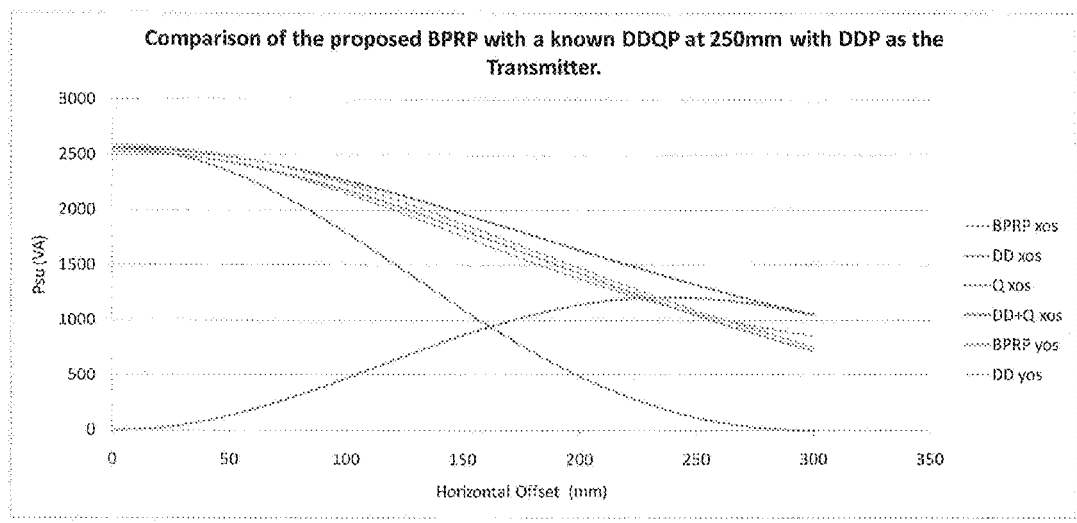
Figure 9: Uncompensated power of a BPRP with csX= 80mm and overlap = 115mm versus a DDQP at 250mm vertical offset

INDUCTIVE POWER RECEIVER APPARATUS

REFERENCE TO RELATED APPLICATIONS

The present disclosure is based on and claims benefit from International Application Number PCT/NZ2011/000154 filed on Aug. 5, 2011 which claims benefit from PCT Application PCT/NZ2010/000160 filed Aug. 6, 2010 and New Zealand application 588937 filed Nov. 1, 2010, the entire contents of each of which are herein incorporated by reference.

FIELD OF THE INVENTION

This invention relates to apparatus for receiving magnetic flux. The invention has particular, but not sole, application to a low profile, substantially flat device such as a pad for power transfer using an inductive power transfer (IPT) system.

BACKGROUND

IPT systems, and the use of a pad which includes one or more windings which may comprise the primary or secondary windings for inductive power transfer, are disclosed in our published international patent application WO 2008/140333, the contents of which are incorporated herein by reference.

One particular application of IPT power transfer pads is electric vehicle charging, and that application is discussed in this section to provide the background to one application of the invention. However, electric vehicle charging is an example of only one application, and the invention has application to inductive power transfer in general. Electric vehicle charging may occur while the vehicle is stationary, or alternatively while the vehicle is moving along a roadway, for example. IPT power transfer pads can be used both in the vehicle as a power "pickup" (i.e. the secondary side winding of the IPT system), and at a stationary location such as a garage floor or a roadway for example as the "charging pad" (i.e. the primary side winding) from which power is sourced.

The purpose of an IPT roadway system is to wirelessly transfer power to a stationary or moving vehicle without physical contact to the vehicle. The transmitting part of the system consists of a power supply supplying a lumped coil (for example a pad as described above) or a track with many similar lumped coils where such a system is tuned for operation at a suitable frequency, usually anywhere from 10 kHz to 150 kHz. Where the receiver is placed underneath a vehicle and coupled to receive power either when the vehicle is stationary above or near (in sufficiently close proximity to couple power) to the primary transmitter. The pickup receiver also typically comprises a lumped coil (such as a pad described above) which is connected to a converter and appropriate controller within the vehicle to regulate power. For convenience, the part of a roadway from which power may be received inductively is referred to herein as a track.

The track may be formed by placing a plurality of pads along the centre of a lane in a roadway. This results in the possibility of an essentially continuous supply of power to the vehicle as it moves along the roadway in the immediate vicinity of the track.

In recent years such systems have received increasing attention due to their potential to allow sustainable wireless powered personal transportation. For such a system to be useful it must not only be able to transfer sufficient power over an airgap of reasonable size (e.g. 100-300 mm) it must also prove tolerant to any displacements between track and pickup, to avoid dependency on a vehicle-to-track guidance system. In a roadway system such displacement will most likely occur in the lateral direction (orthogonal to both vertical and the direction of movement) for moving vehicles. For stationary vehicle charging the ability to transfer acceptable levels of power with suitable longitudinal displacement is of particular concern in order to ensure ease of parking. The power transfer profile in the pick-up pad is ideally a smooth power profile which is essentially constant (and sufficient) over as wide as possible a distance laterally, with smooth drop-offs at each end. Such a power transfer profile eases the demands on the electronic (primary and secondary) regulators in the system, enabling improved operating performance for a comparable coupling over a system where during operation significant variations are experienced in the coupling between the primary and receiver pads.

Referring to FIG. 1, a magnetic flux pad construction previously disclosed by Boys, Covic, Huang and Budhia is shown which has excellent characteristics suitable for vehicle applications. The construction of FIG. 1 has been published in international patent publication WO2010/090539A1. For convenience, this general construction is referred to herein as a DDP pad, and is generally referenced DDP in the relevant drawing figures in this specification.

The DDP pad shown in FIG. 1 generally comprises two substantially coplanar coils referenced 2 and 3 which are magnetically associated with and sit on top of, a core 4. As can be seen from the drawing figure, the core 4 may consist of a plurality of individual lengths of permeable material such as ferrite strips or bars 5 which are arranged parallel to each other but spaced apart. The pad construction may include a spacer 6 on which the core is located, and a plate 7 below the spacer. In some embodiments a cover 8 may be provided on the other surface of the flat coils 2 and 3. Padding 9 may be provided about the periphery of the pad. As can be seen, the coils 2 and 3 each define a pole area 10 and 11 respectively. This DDP pad construction as shown in FIG. 1 is a polarised pad that shows very good characteristics suitable for IPT power transfer applications such as vehicle charging. The coils 2, 3 may be connected in series but electrically out of phase and driven by a single inverter to produce a stationary time varying magnetic field to couple to a receiver (which may for example be of substantially the same magnetic design) at distances suitable for electric vehicle power transfer with good coupling.

Turning now to FIG. 2, the DDP construction of FIG. 1 is shown but further including a quadrature coil 12 (referred to herein as a DDPQ pad). This construction is also described in patent publication WO2010/090539A1. The quadrature coil extends the power transfer profile when there is lateral movement of the construction shown in FIG. 2 with respect to a flux generator such as the DDP pad of FIG. 1 when energised by an appropriate inverter. The quadrature coil allows power to be extracted from the "vertical" component of the magnetic field that the receiver pad intercepts while the other coils 2, 3 facilitate power extraction from the "horizontal" component of the flux intercepted. Therefore, the construction of FIG. 2 is suited as a flux receiver.

OBJECT OF THE INVENTION

It is an object of the present invention to provide apparatus for receiving magnetic flux for the purposes of inductive power transfer, or to at least provide the public or the industry with a useful choice.

SUMMARY OF THE INVENTION

In one aspect the invention broadly provides a magnetic flux pad for receiving magnetic flux, the pad comprising a magnetically permeable core, and two overlapping coils magnetically associated with the core.

Preferably the magnetic properties of the coils are substantially the same.

Preferably there is substantially no mutual coupling between the coils.

Preferably the coils are substantially completely magnetically decoupled.

Preferably the coils partially overlap.

Preferably the coils are substantially flat.

Preferably the coils are substantially coplanar.

Preferably the coils are provided on one side of the said permeable core, and a shielding means is provided on the other side of the core.

Preferably the shielding means comprises a shielding plate made of a suitable material such as aluminium.

Preferably a dielectric cover is provided on the side of the coils opposite the magnetic core.

In a further aspect the invention provides pick-up apparatus for an inductive power transfer system, the power supply apparatus including:
 a magnetic flux pad for receiving a magnetic flux, the pad comprising magnetically permeable core, two substantially flat overlapping coils magnetically associated with the core; and
 apparatus adapted to tune each coil and combine the output of each tuned coil to provide power to an output of the pick-up.

Preferably the apparatus includes switching means to regulate the power available at the output.

In a further aspect the invention broadly provides a method for providing an IPT magnetic flux pad having a plurality of coils in which there is no mutual magnetic coupling between the coils, the method including the steps of:
 overlapping the coils
 varying the overlap between the coils such that an overlap position is achieved whereby there is substantially no mutual coupling between the coils.

Preferably the absence of mutual coupling is detected by detecting when the open circuit voltage induced in one of the coils by energisation of the other coil is minimised.

Further aspects of the invention will become apparent from the following description.

DRAWING DESCRIPTION

One or more embodiments of the invention will be described with reference to the accompanying drawings in which:

FIG. 1 is a side view and a plan view respectively of a magnetic flux pad;

FIG. 2: is a side view and plan view respectively of the pad of FIG. 1 including a quadrature coil;

FIG. 3: is a side view and plan view respectively of an alternative form of magnetic flux pad;

FIG. 4: The Bipolar Receiver Pad shown with csX=−80 mm and Overlap=115 mm

FIG. 5: The induced voltage in a second receiver coil with varying X coil spacing (csX) versus changing "Overlap" of the two coils, when a first receiver coil is energised. Note while absolute csX values are given, all are effectively negative to co-inside with FIG. 3.

FIG. 6: Uncompensated power profile of various BPRP designs versus a standard DDP at 250 mm vertical offset FIG. 7: The uncompensated power profile of a BPRP receiver with csX=−80 mm and overlap=115 mm when placed above a DDP transmitter at fixed height of 250 mm. Here each bipolar coil's contribution is explicitly shown as the BPRP is shifted laterally in either the positive x or positive y directions.

FIG. 8: Example decoupling regulator for the Bipolar Receiver pad (BPRP)

FIG. 9: Uncompensated power of a BPRP with csX=−80 mm and overlap=115 mm versus a DDQP at 250 mm vertical offset

DESCRIPTION OF ONE OR MORE PREFERRED EMBODIMENTS

Turning now to FIG. 3, another construction is shown which is referred to in this document as a bi-polar receiver pad or, alternatively, as a BPRP. The BPRP pad has a similar construction to the DDP discussed with respect to FIGS. 1 and 2 above as it enables excellent coupling to primary receivers at distances suitable for charging and powering of electric vehicles but uses substantially less copper than the construction of the DDPQ pad of FIG. 2, to achieve very similar results. The BPRP can be used to receive flux from a transmitter of the same construction, or from other transmitters, such as the DPP described above.

In one embodiment the BPRP pad consists, from bottom up, of an aluminium plate 7, a dielectric spacer 6, a core 4 comprising four rows of ferrite bars 5 (referred to herein as ferrites), two flat substantially coplanar, yet overlapping and ideally "rectangular" shaped coils 2, 3 (although in practice these are more oval due to the ease in winding Litz wire) spread out in the lateral direction, and a dielectric cover 8. Coils 2 and 3 are only sensitive to vertical flux, but the spatial arrangement of both coils gives particular advantages in coupling power from other transmitter structures. Coils 2 and 3 have, at least in one embodiment, substantially the same magnetic properties. The core 4 acts as a shield so that ideally all flux is channeled through the core 4 through the top of the pad. The plate 7 merely acts to a) eliminate and small stray or spurious fields that may be present below the core 4 (as shown in FIG. 3) in certain environments, and b) provide additional structural strength. As such magnesium could also be used to achieve a similar result and this has advantages in that As such magnesium could also be used to achieve a similar result and this has advantages in that it is extremely light and has a high internal damping so that under conditions of mechanical shock the ferrites within the pad are less likely to be damaged.

The magnetic structure of the BPRP is designed so that there is substantially no mutual coupling between either of the coils 2, 3 in the primary, as described later. This allows the coils to be tuned independently at any magnitude or phase without coupling voltage into each other, which if present would oppose the power output of such a coil. Each coil can be independently tuned and regulated without affecting the flux capture and power transfer of the other coil.

When the two primary coils 2, 3 of the BPRP are placed with an arbitrary overlap with respect to each other, there will be a mutual coupling between the coils. However for a certain ratio of overlap to coil width, this mutual coupling is almost zero. The ideal overlap required to ensure no mutual coupling exists between each coil is not simple due the presence of ferrite in both the BPRP and in a nearby transmitter pad (such as the DDP transmitter) but can be determined by simply placing the BPRP in its desired operating position at known height relative to the transmitter and fixing one coil and energising this with a predetermined current at fixed frequency (either via a suitable 3D simulator or using a suitable experimental setup, for example). The open circuit voltage induced in the second primary coil can then be measured. If the second coil is moved so as to change the overlap there will be a change in coupled voltage. When this is minimised (ideally zero) the ideal configuration can be set. Notably the ideal overlap will change slightly with movement of the BPRP relative to a known transmitter such as the DDP, due to the shift in relative proximity of the transmitter ferrite, however this change is relatively minor given there is a large air-gap between both pads. As such for almost all working variations that can be considered reasonable the BPRP coils 2 and 3 will stay substantially mutually decoupled within a few percent.

This magnetic decoupling of coils 2 and 3 allows either of the coils to be independently tuned and rectified to the output without affecting each other. As such they can also be turned off (independently decoupled from the transmitter) using switches without affecting the flux capture of the other coil.

In the evaluation described herein the length of the ferrite strips was held constant and made to be as long as possible within the dimensions of the chosen pad. The ferrite strips were constructed using readily available slabs that are each a standard length of 93 mm. Each strip was conveniently chosen to be multiples of this length and in the design chosen for evaluation, each strip included 9 Ferrite slabs (837 mm) as indicated in FIG. 4. While the width of the chosen coils was fixed to 84 mm, it was of interest to evaluate the optimal size of the coils for flux capture and to determine if the volume of copper required within the receiver could be minimised without compromising the flux capture. As such the spacing between the ferrite end and the coil edge called "X Coil Spacing" or "csX" in FIG. 3 was varied. In this evaluation csX has a negative value if the ferrite extends underneath the coil. In the example of FIG. 4, a csX of −80 mm is used (as detailed in Table A3) so that there is approximately 4 mm separation between the end of the ferrite and the edge of the 84 mm wide coil comprising 21 turns. The length of the coil is fixed by fixing the overlap of the two receiver coils in FIG. 4 (shown here as a 115 mm spacing). The overlap is determined to ensure there is no mutual coupling between the coils as described above. The y dimension of the coils is maintained constant at the maximum width allowable within the dimensions of the Pad.

The results of the simulation in FIG. 5 show the required overlap distance to ensure zero mutual coupling between the receiver coils for varying csX values (in the Figure absolute values of csX are listed but all are negative with respect to the definition of FIG. 3). The required overlap increases with decreasing negative csX. For csX variations=−80, −90, −100, −120 or −160 mm, the required overlap is approximately 115, 100, 86, 65 and 35 mm respectively.

In one embodiment, the two coils within the BPRP are independently tuned and rectified to the load as shown in an example parallel tuned decoupling regulator of FIG. 8, although those skilled in the art will recognise that various other decoupling or non-decoupling control circuits can be used to extract and regulate the power from this pad, and in such cases it may be desired to series tune coils 2 and 3 rather than operate with parallel tuning as shown. FIG. 8 shows one configuration of the BPRP pad which may comprise part of an IPT pick-up circuit for supplying power to a load connected to the pick-up. The two coils 801 and 802 are essentially identical each having N turns and lie above a number of strips of ferrite 803 to enhance the field as shown in FIG. 3 and FIG. 4. Capacitors 804 and 805 are selected at the operating frequency of the system to have the same nominal reactance as the coils 801 and 802 respectively so that they are tuned to resonance when operating at the nominal system frequency. The outputs of both pads are rectified using separate full bridge rectifiers 806 and 807, and the inputs are then applied to a common low pass filter comprising DC inductor 808 and capacitor 811. Switch 809 can be used to regulate the power to the load which would be configured at the output of capacitor 811, and when switch 809 is closed, diode 810 ensures that capacitor 811 does not discharge. AC switches 812 and 813 are optional, but in one embodiment are closed if either of receiver coil 801 or 802 are not coupling flux in order to minimise loss in the resonant circuit. A simple measure of the flux capture is the short circuit current in either of these AC switches. Once the short circuit current is determined to be above a suitable threshold, the switch can be opened and the circuit will naturally resonate. The RMS voltage across each parallel tuning capacitor will be clamped if the voltage across the output DC capacitor is regulated. In practice the power delivered to the output will be determined by the output voltage and currents being sourced by each of coils 801 and 802.

The finite element solver JMAG Studio version 10.0 was used to simulate all proposed magnetic structures. The power profiles given here are the total uncompensated VA power output which is determined using separate measurements of the receiver open circuit voltage ($V_{oc}$) and short circuit current ($I_{sc}$). The uncompensated VA is a well known measure of the power performance of a pad given by $S_u = V_{oc} * I_{sc}$. As the results of each coil can be controlled and processed independently then the total uncompensated power profiles shown here is simply the addition of each receiver coils uncompensated power.

The performance of all BPRP configurations described earlier with varying csX were investigated and the results are shown in FIG. 6. The parameters governing their relative position are referred to as the offset distances, in Cartesian coordinates, that is: $x_{os}$ (lateral), $y_{os}$ (longitudinal) and $z_{os}$ (vertical). In this evaluation a DDP transmitter is placed on the ground with the ferrite underneath and the coils above, while the BPRP pad is positioned above it so that its coils are facing downward and the ferrite sits above it. As both pads are polarised by design, then preferably the ferrite strips in each pad are along the x axis. The configuration of the two pads lying on top of each other with their dielectric lids touching is (0,0,0). In the presented results of FIG. 6 a vertical offset $z_{os}$=250 mm was used and the DDP transmitter (FIG. 1) was constructed (as defined in Table A1) using 6 ferrite strips each comprising 7 ferrite slabs (each ferrite strip is 651 mm long) and a positive csX spacing of 10 mm is used (FIG. 1) having a winding width of 84 mm comprising 21 turns each connected in series and energised with 20 A at 20 kHz. Although a DDP transmitter has been used in this example, those skilled in the art will understand that the flux received by a BPRP pad may originate from a number of different sources, including a multiphase system and/or a track for example.

As can be seen from FIG. 6, the IPT system designer can select csX to provide a required profile i.e. change in Psu with horizontal offset. The designer can also select csX based on the amount of power required with offset to minimise the amount of copper in the receiver. Thus the invention also provides a pad, or a method of pad construction, which enables a required power output profile and/or a required coil/copper quantity.

For comparison purposes, a DDP receiver having identical dimensions and ferrite (6×9 strips) to the BPRP as described in Table A2 (although here the Quadrature coil is not used) was also simulated as a known receiver. Notably most of the BPRP configurations outperform the DDP for horizontal offsets of around 100 mm. As the csX is increased the peak power available at the centre is lowered, and the rate of change in power with offset is reduced. A csX of −80 mm however results in almost an identical peak power to the DDP at the ideal centre position with no offset and outperforms the DDP at horizontal x offsets above 40 mm. The reduction in power in the x offset direction is well known in the DDP and is mitigated if a quadrature coil is introduced as shown in the DDQP structure of FIG. 2 which is considered later.

For the BPRP configuration with csX=−80 mm and overlap of 115 mm (as defined in Table A3), FIG. 7 shows the explicit uncompensated power contributions of each of the receiver coils that make up the BPRP when it is positioned 250 mm vertically above the DDP transmitter of FIG. 1 (configured as in Table A1) but shifted laterally in either the x or y directions. In FIG. 7 the output of each of these coils is indicated by use of labels A and B respectively (where A represents the coil on the left of FIGS. 4 and B represents the coil on the right of FIG. 4). Notably the contributions are identical when the pad is shifted in the y direction as each of the receiver coils are equidistant from the DDP transmitter. When shifted in the positive x direction, then receiver coil B is shifted further away from the transmitter and therefore captures less flux, while coil A captures a greater percentage of the available flux. If the BPRP were shifted in the opposite negative x direction, then the flux capture would naturally reverse.

The best BPRP configuration with csX=−80 mm and overlap of 115 mm was compared against the DDQP structure of FIG. 2 using dimensions as given in table A2 that ensured a fair comparison—i.e. using identical coil widths, outer dimensions and numbers of ferrite (6×9 strips) to the BPRP. The DDQP pickup has two sets of coils, 2, 3 (DD) (assuming the two DD coils are in series) and the quadrature (Q) coil 12. In this case the uncompensated power is found for both sets of coils separately and the total uncompensated power available from the pickup is referred to as the total power which is simply calculated as the sum of the power from the two sets of coils. It is this total power which underlies the power transfer profile. Both structures were energised using the transmitter pad configured as a DDP using 6 ferrite strips each comprising 7 ferrite slabs and energised identically as described earlier and detailed in Table A1. The comparative results are shown in FIG. 9 showing uncompensated power variations in both the x and y directions.

Notably, the BPRP has power profiles which are almost identical with offset in both x and y directions which is desirable. In comparison the DDQP output is similar; here the quadrature winding only improves power flow in the x direction, and therefore its complete profile is shown as "DD yos" in the y direction and "DD+Q xos" for the x direction.

In consequence the BPRP has a power profile which is almost identical for the majority of the useable offset range. It requires 17% more copper that the DDP, but the DDQP uses 56% more copper that the DDP. In consequence the DDQP uses 34% more copper than the BPRP and only produces slightly improved power profile in the x direction (perhaps 20-25% improvement at best at 200-250 mm offset)

For the BPRP various known decoupling regulators could be used to extract the power, or alternatively synchronised converters to enable bidirectional power transfer as required for grid to vehicle or vehicle to grid configurations.

TABLE A1

Dimensions of the transmitter DDP

| | |
|---|---|
| Winding width | 84 mm |
| Inner winding width | 84 mm |
| Ferrite spacing | 33 mm |
| Ferrite width | 28 mm |
| Y coil spacing | 10 mm |
| Y padding | 0 mm |
| Cover thickness | 6 mm |
| Coil height | 4 mm |
| Ferrite height | 16 mm |
| Spacer thickness | 6 mm |
| Plate thickness | 4 mm |
| Ferrite length | 651 mm |
| X coil spacing (csX) | 10 mm |
| X padding | 0 mm |

TABLE A2

Dimensions of the receiver DDP and DDQP

| | |
|---|---|
| Winding width | 84 mm |
| Inner winding width | 84 mm |
| Ferrite spacing | 33 mm |
| Ferrite width | 28 mm |
| Y coil spacing | 10 mm |
| Y padding | 0 mm |
| Cover thickness | 6 mm |
| Coil height | 4 mm |
| Ferrite height | 16 mm |
| Spacer thickness | 6 mm |
| Plate thickness | 4 mm |
| Ferrite length | 837 mm |
| X coil spacing (csX) | −80 mm |
| X padding | 0 mm |
| Quadrature coil length | 516 mm |

TABLE A3

Dimensions of the receiver BPRP

| | |
|---|---|
| Winding width | 84 mm |
| Ferrite spacing | 33 mm |
| Ferrite width | 28 mm |
| Y coil spacing | 10 mm |
| Y padding | 0 mm |
| Cover thickness | 6 mm |
| Coil height | 4 mm |
| Ferrite height | 16 mm |
| Spacer thickness | 6 mm |
| Al Plate thickness | 4 mm |
| Ferrite length | 837 mm |
| Overlap | 115 mm |
| X Coil spacing (csX) | −80 mm |
| X padding | 0 mm |

The flux receiver construction described herein can also be used to sense the presence and alignment of the receiver with a transmitter. The transmitter may have a similar construction to the receiver, but could be a different construction, for example the transmitter could be a circular single coil pad structure such as that disclosed in WO2008/140333. In one example, where coils 2 and 3 are parallel tuned as in FIG. 8, the extent of alignment (or misalignment) is detected by activating decoupling switch 809 and sensing the magnitude and phase of the AC short circuit current in one of coils 2, 3 with respect to the other, whereas in applications where the coils are series tuned the extent of alignment (or misalignment) can be determined by again decoupling both receiver coils and measuring the magnitude and phase of the open circuit voltage of coils 2 and 3.

While the above description of the magnetic assembly describes two overlapping coils which preferably are substantially mutually decoupled, it will be apparent to those skilled in the art, that in some instances it may be helpful to have overlapping coils which are not substantially mutually decoupled. For example, it may be desirable to make the coils wider and therefore the overlap is larger than necessary. In such instances the combined power received from both coils 2 and 3 when the receiver is ideally aligned with a suitable transmitter will be less than if they were designed to be mutually decoupled, however because coils 2 and 3 are made wider they can better capture the available flux when the receiver is displaced laterally from a suitable transmitter and this may be an advantage in some designs to help improve tolerance to misalignment. Under such a design, where there is deliberate known mutual coupling introduced between receiving coils 2 and 3, then if either switches 812 or 813 of FIG. 8 is used to decouple either coil 2 or 3, it will necessarily influence the coupled power in the other receiver coil. Such a decision as to whether to activate AC switch 812 or 813 needs to be determined against the additional loss which is added when the receiver is displaced so that only one coil (2 or 3) is providing all the useable power, while the other receiving coil is allowed to freely resonate without delivering any useable power to the load. In either case, the output can still be fully controlled using decoupling switch 809, to decouple both coils 2 and 3 when no power is desired at the output.

The coils are preferably made from litz wire. We have found that litz wire manufactured from aluminium (rather than the conventional copper) offers significant unexpected advantages. Aluminium has previously been considered to be unsuitable because it is very fragile and it cannot be soldered to make terminations. However, we have found that it can be manufactured as Litz wire from individual strands of 0.3 mm diameter and in such a form is lighter and provides up to approximately seven times as much useful wire as copper for a comparable cost. Aluminium Litz wire can be used in other flux generating and receiving magnetic structures which include the pad structures described in this document and others including without limitation the circular pads referred to in WO2008/140333 for example. Aluminium can also be used as copper clad aluminium which can be drawn to size, and assembled if desired to provide litz wire. It can thus be soldered, and is about 75% lighter than conventional copper wire while being able to be used essentially as a conventional wire as well as litz wire.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope or spirit of the invention.

The invention claimed is:

1. A magnetic flux pad for receiving magnetic flux, the pad comprising a magnetically permeable material, and two coils magnetically associated with the magnetically permeable material, the coils overlapping each other so as to have minimal mutual coupling.

2. A magnetic flux pad as claimed in claim 1 and wherein magnetic properties of the coils are substantially the same.

3. A magnetic flux pad as claimed in claim 1 wherein there is substantially no mutual coupling between the coils.

4. A magnetic flux pad as claimed in claim 1 wherein the coils are substantially completely magnetically decoupled.

5. A magnetic flux pad as claimed in claim 1 wherein the coils are substantially flat.

6. A magnetic flux pad as claimed in claim 1 wherein the coils are provided on one side of the magnetically permeable material, and a shielding is provided on another side of the core magnetically permeable material.

7. A magnetic flux pad as claimed in claim 6 wherein the shielding comprises a shielding plate.

8. A magnetic flux pad as claimed in claim 7 wherein the shielding plate is made from aluminium or magnesium or other suitable material.

9. A magnetic flux pad as claimed in claim 1 wherein a dielectric cover is provided on a side of the coils opposite the magnetically permeable material.

10. A magnetic flux pad as claimed in claim 1 further comprising apparatus adapted to tune each coil and combine an output of each tuned coil to thereby provide power.

11. Pick-up apparatus for an inductive power transfer system, the pick-up apparatus comprising:
a magnetic flux pad for receiving a magnetic flux, the pad comprising a magnetically permeable material, two coils magnetically associated with the magnetic permeable material, the coils overlapping each other so as to have minimal mutual coupling; and
apparatus adapted to tune each coil and combine an output of each tuned coil to provide power to an output of the pick-up.

12. Pick-up apparatus as claimed in claim 11 further comprising a switch to regulate the power available at the output.

13. Pick-up apparatus as claimed in claim 11 further comprising a detector to detect alignment of the magnetic flux pad of the pick-up with a transmitter flux pad.

14. A method for providing an IPT magnetic flux receiver pad having a plurality of coils in which there is no mutual magnetic coupling between the coils, the method comprising:
overlapping the coils; and
varying the overlap between the coils such that an overlap position is achieved whereby there is substantially no mutual coupling between the coils.

15. A method as claimed in claim 14 wherein absence of mutual coupling is detected by detecting when an open circuit voltage induced in one of the coils by energisation of the other coil is minimised.

16. A magnetic flux pad as claimed in claim 13, wherein the detector is adapted to sense a short circuit current or an open circuit voltage of the coils.

17. A magnetic flux pad as recited in claim 1, adapted for transfer of power over an air gap greater than substantially 100 mm.

18. A magnetic flux pad as recited in claim 1, adapted for transfer of power over an air gap between substantially 100-300 mm.

19. A magnetic flux pad as recited in claim 1, wherein a dimension of each coil extends beyond the magnetic permeable material.

20. A magnetic flux pad as recited in claim 1, wherein the coils extend beyond the magnetic permeable material.

\* \* \* \* \*